US011433793B2

(12) United States Patent
Jeong

(10) Patent No.: US 11,433,793 B2
(45) Date of Patent: Sep. 6, 2022

(54) HEADREST CONTROLLING APPARATUS

(71) Applicant: WOOBO TECH CO., LTD., Pyeongtaek-si (KR)

(72) Inventor: Hae Il Jeong, Incheon (KR)

(73) Assignee: Woobo Tech Co., Ltd., Pyeongtaek-si (KR)

( * ) Notice: Subject to any disclaimer, the term of this patent is extended or adjusted under 35 U.S.C. 154(b) by 6 days.

(21) Appl. No.: 16/649,200

(22) PCT Filed: Jun. 18, 2018

(86) PCT No.: PCT/KR2018/006812
§ 371 (c)(1),
(2) Date: Mar. 20, 2020

(87) PCT Pub. No.: WO2019/066195
PCT Pub. Date: Apr. 4, 2019

(65) Prior Publication Data
US 2020/0215947 A1     Jul. 9, 2020

(30) Foreign Application Priority Data
Sep. 26, 2017 (KR) .......................... 10-2017-0124342

(51) Int. Cl.
*B60N 2/838* (2018.01)
*B60N 2/90* (2018.01)

(52) U.S. Cl.
CPC ............. *B60N 2/838* (2018.02); *B60N 2/938* (2018.02)

(58) Field of Classification Search
None
See application file for complete search history.

(56) References Cited

U.S. PATENT DOCUMENTS

| | | | |
|---|---|---|---|
| 4,779,929 A * | 10/1988 | Kuchemann | B60N 2/838 297/391 |
| 9,126,513 B2 * | 9/2015 | Jeong | B60N 2/865 |
| 9,403,458 B2 * | 8/2016 | Jeong | B60N 2/844 |

(Continued)

FOREIGN PATENT DOCUMENTS

| | | |
|---|---|---|
| KR | 20-0426352 Y1 | 9/2006 |
| KR | 10-2008-0084553 A | 9/2008 |

(Continued)

OTHER PUBLICATIONS

International Searching Authority/KR, International Search Report and Written Opinion of the International Searching Authority, Application No. PCT/KR2018/006812, dated Oct. 16, 2018, 8 pages.

*Primary Examiner* — David E Allred
(74) *Attorney, Agent, or Firm* — Sunstein LLP

(57) ABSTRACT

The present invention relates to a headrest controlling apparatus, and more particularly, to a headrest controlling apparatus which includes a headrest cover, a bracket installed on a stay rod, and a locking member installed in the bracket to fix a position of a headrest, wherein the headrest cover includes a stay rod coupling part to which the stay rod is rotatably coupled, and thus the headrest controlling apparatus can minimize a distance from the stay rod to a front lower edge of the apparatus, can be easily assembled due to the modularized bracket and locking member, and can be easily operated due to increased precision of the locking member.

3 Claims, 16 Drawing Sheets

(56) References Cited

U.S. PATENT DOCUMENTS

| | | |
|---|---|---|
| 9,499,078 B2 | 11/2016 | Jeong |
| 2009/0317176 A1* | 12/2009 | Shimizu ................. B60N 2/888 403/24 |
| 2010/0327645 A1 | 12/2010 | Jeong |
| 2011/0062762 A1* | 3/2011 | Mita ...................... B60N 2/818 297/410 |
| 2011/0204686 A1* | 8/2011 | Lee ........................ B60N 2/838 297/216.12 |
| 2013/0320737 A1* | 12/2013 | Jeong .................... B60N 2/806 297/391 |
| 2014/0182404 A1* | 7/2014 | Jeong .................... B60N 2/818 74/89.23 |

FOREIGN PATENT DOCUMENTS

| | | |
|---|---|---|
| KR | 10-0982796 B1 | 9/2010 |
| KR | 10-2011-0029766 A | 3/2011 |
| KR | 10-1044067 B1 | 6/2011 |
| KR | 10-1071615 B1 | 10/2011 |
| KR | 101171234 B1 | 8/2012 |
| KR | 10-1327394 B1 | 11/2013 |
| KR | 10-1592467 B1 | 2/2016 |
| WO | 2012/015203 | 2/2012 |

\* cited by examiner

[Fig. 1]
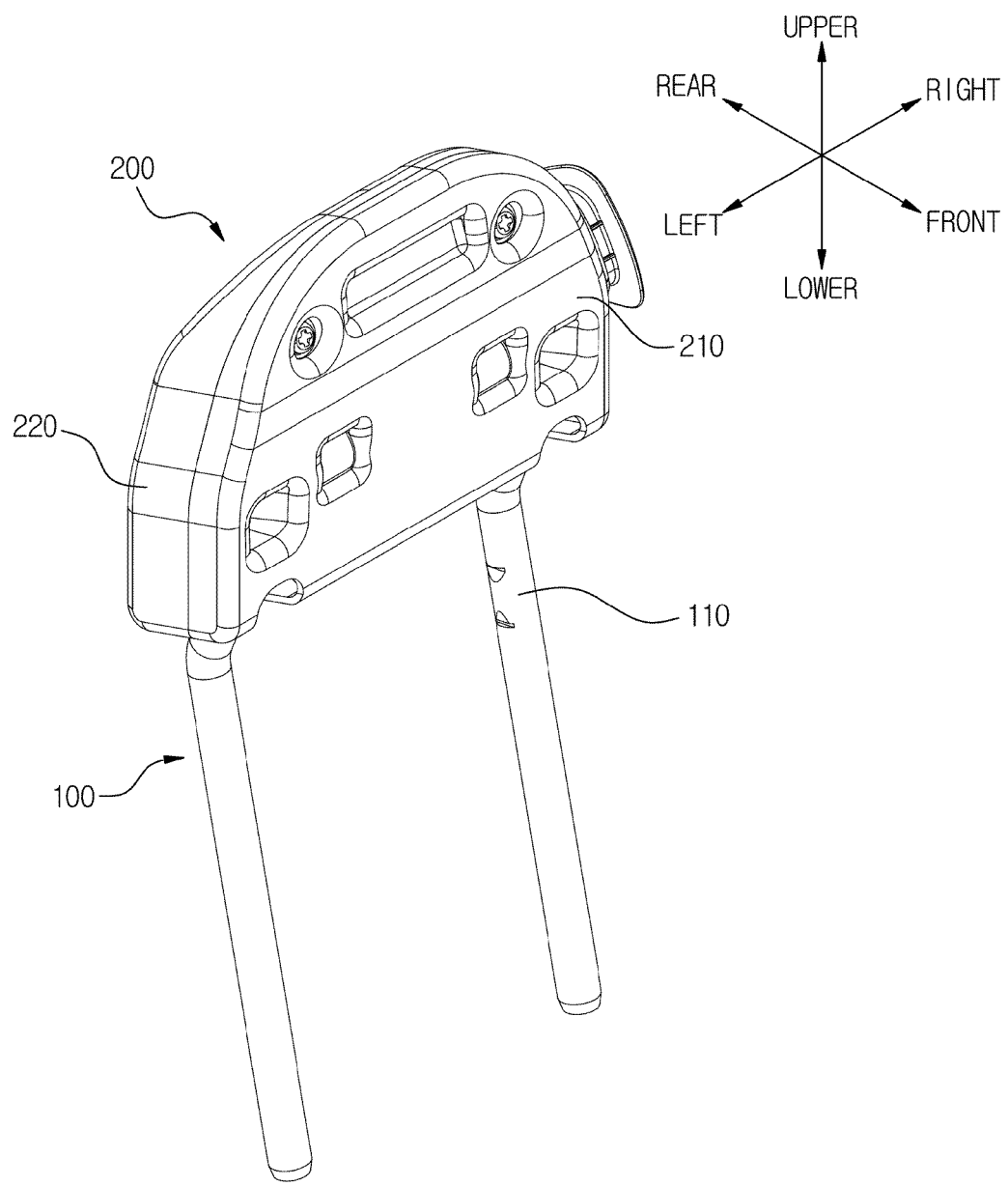

[Fig. 2]
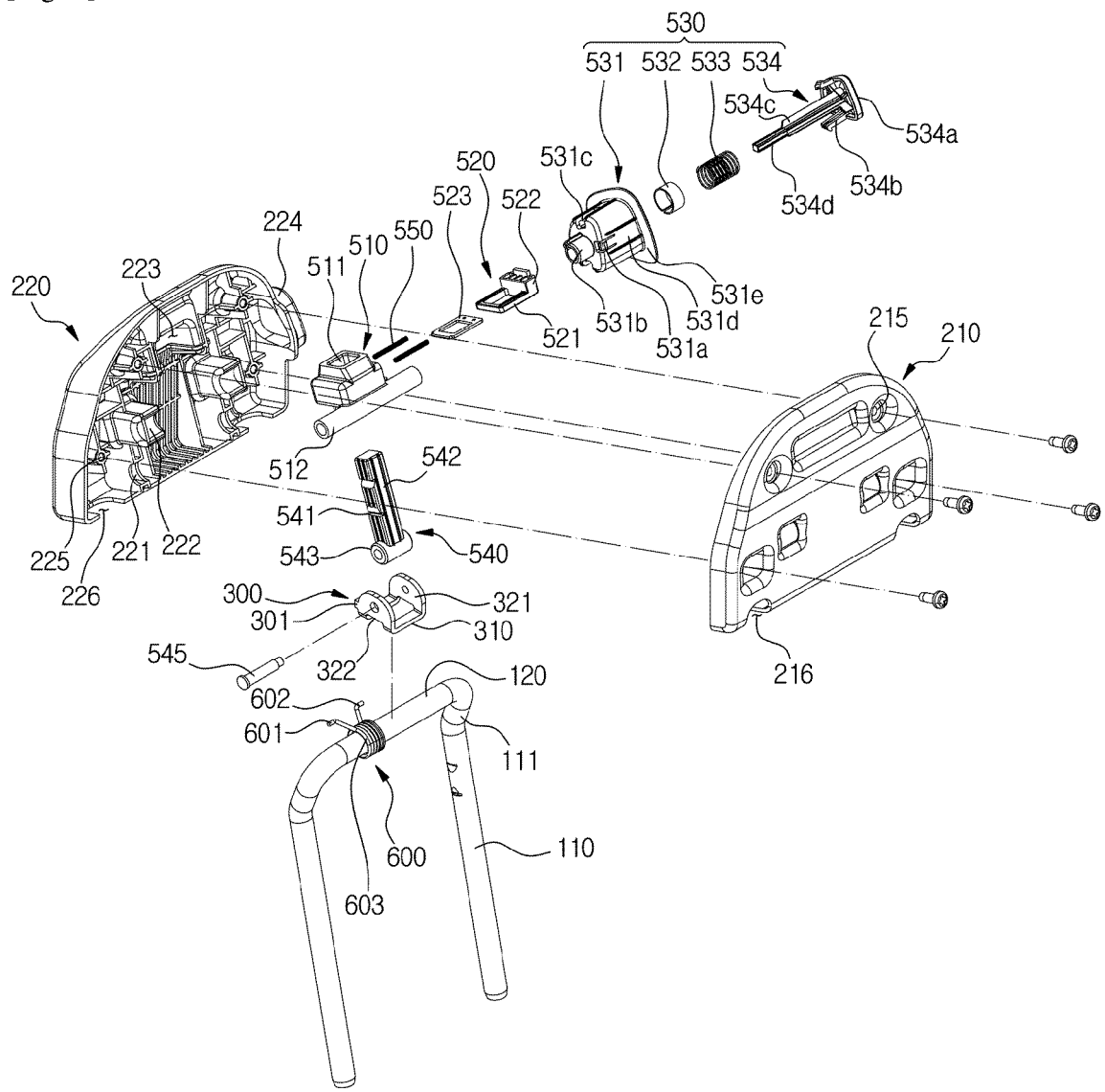

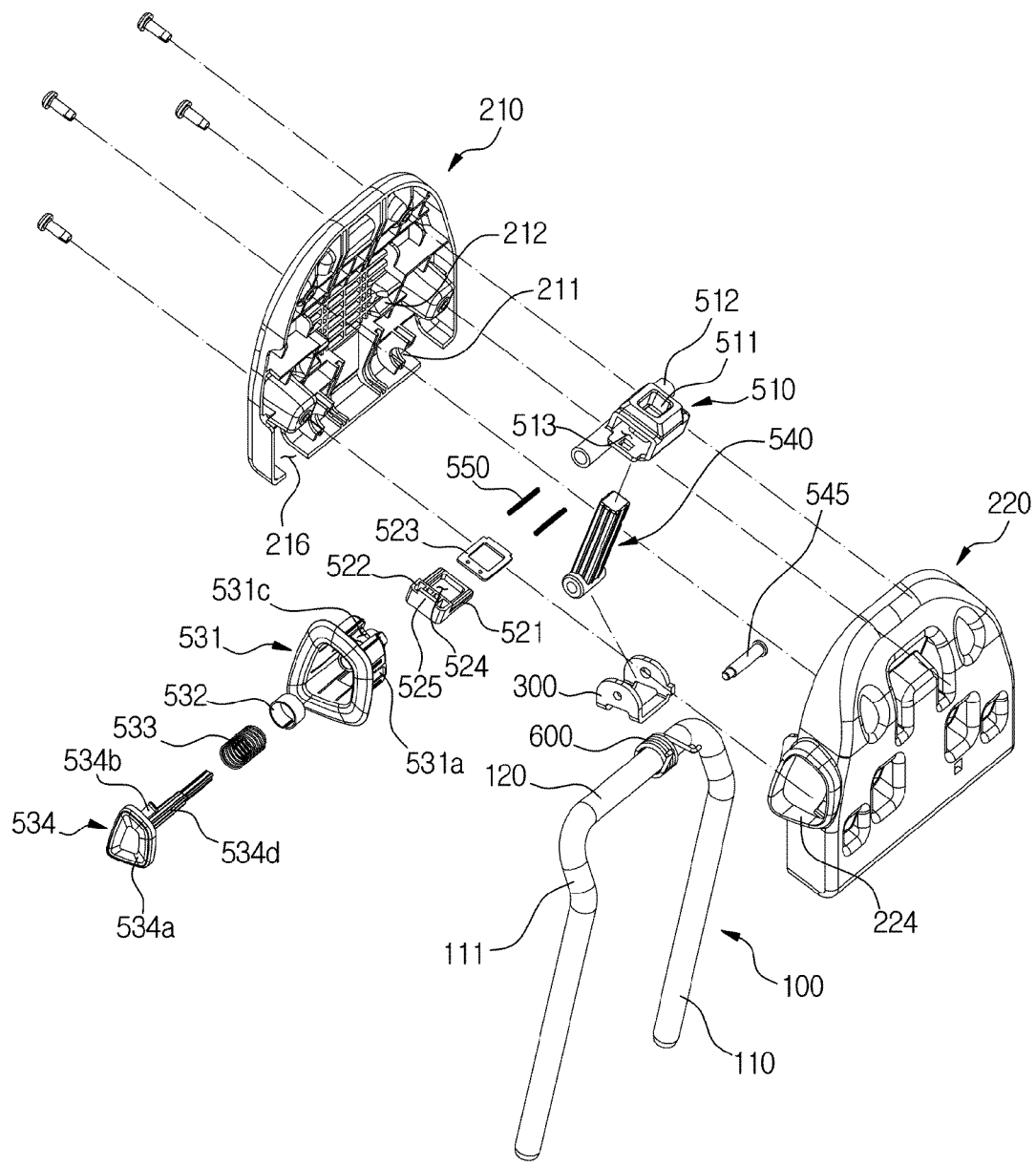
[Fig. 3]

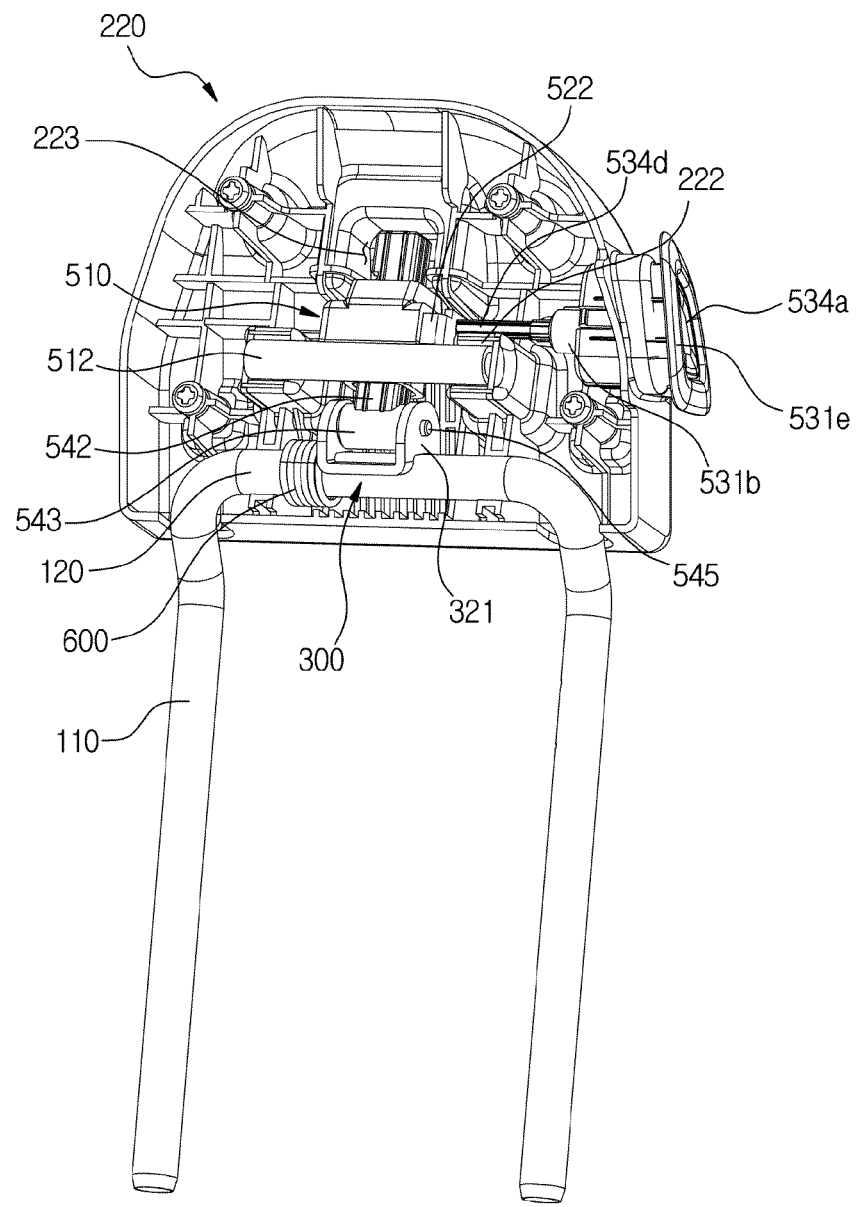
[Fig. 4]

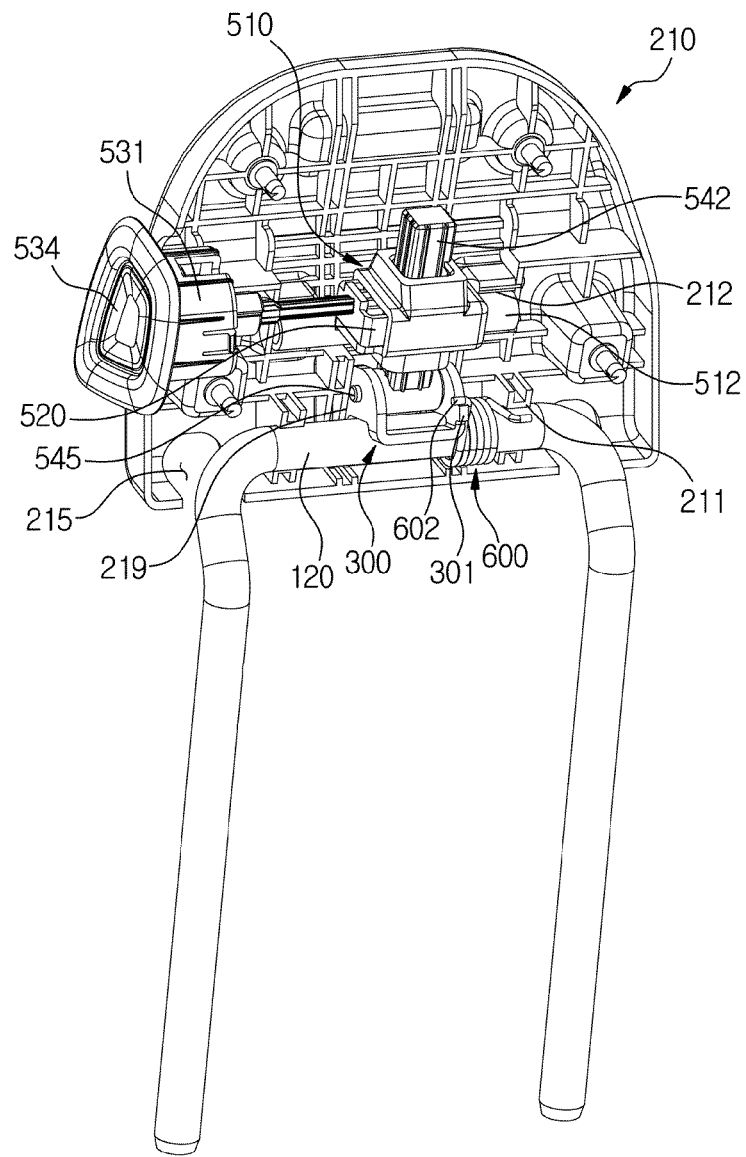
[Fig. 5]

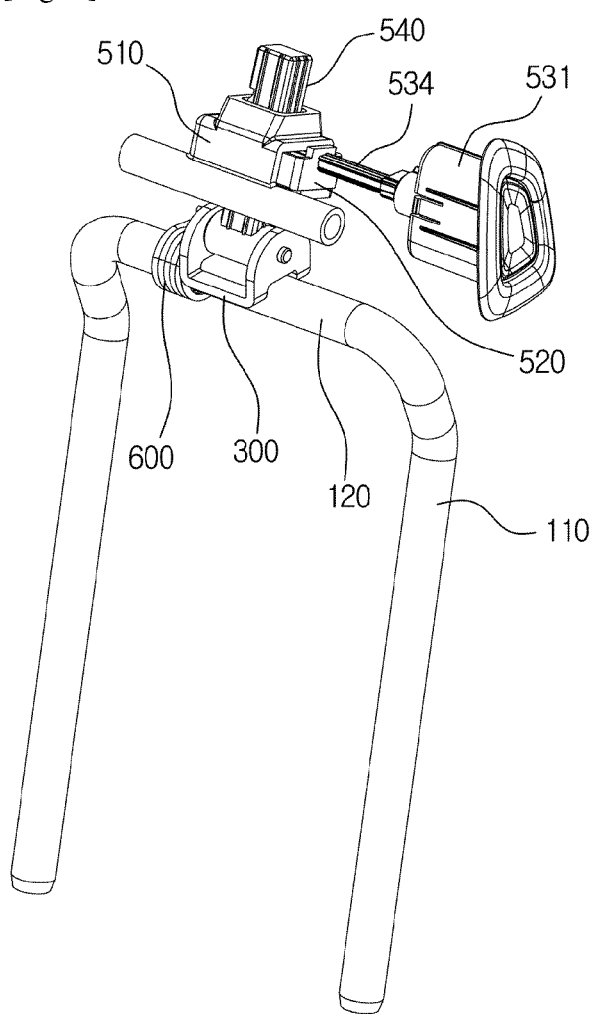
[Fig. 6]

[Fig. 7]
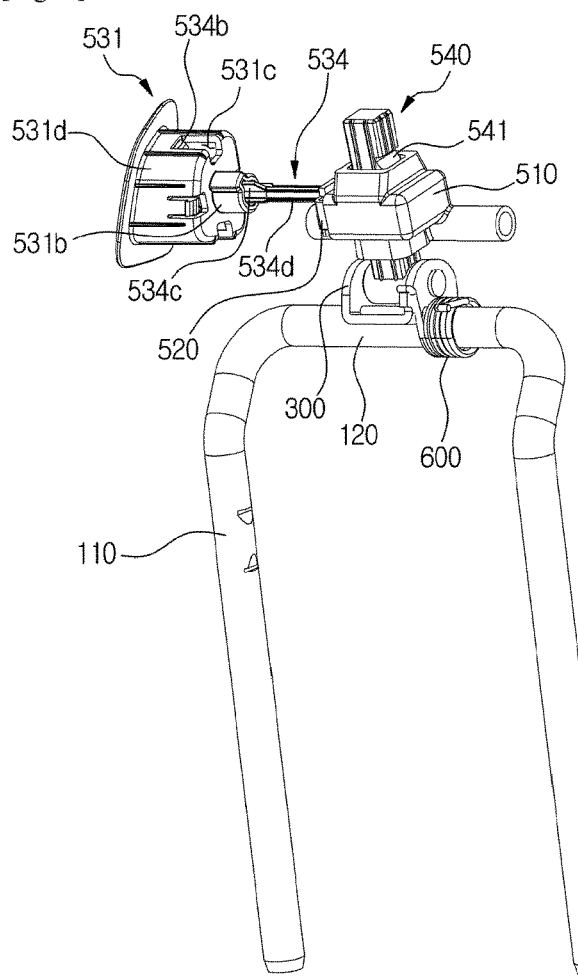
[Fig. 8]
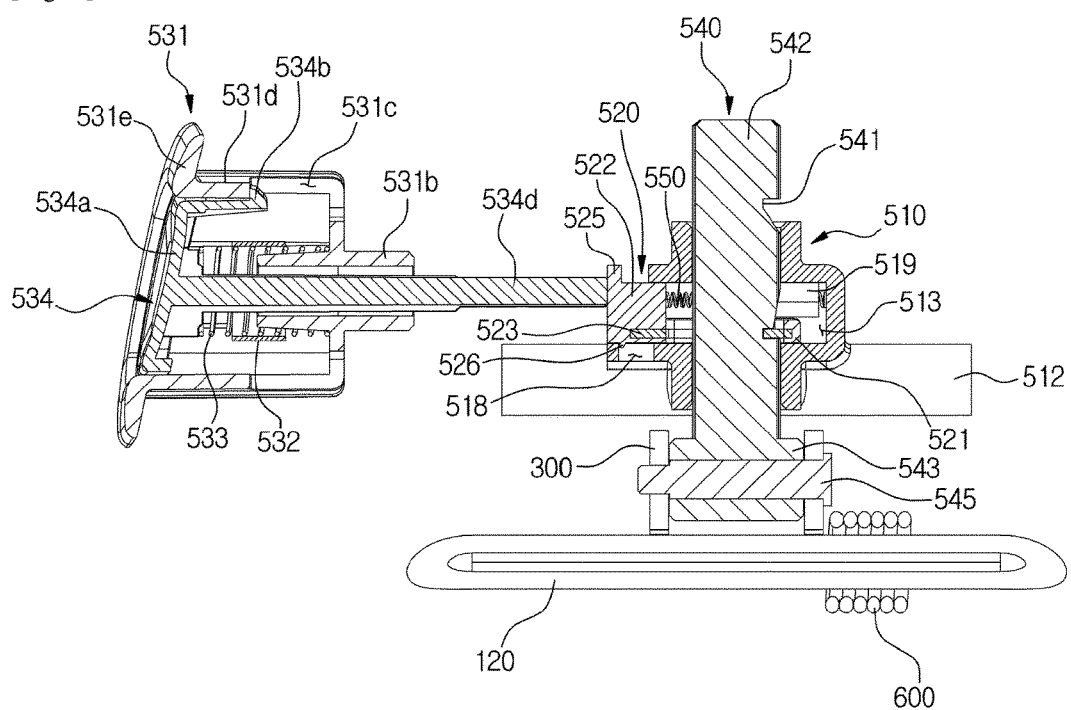

[Fig. 9]
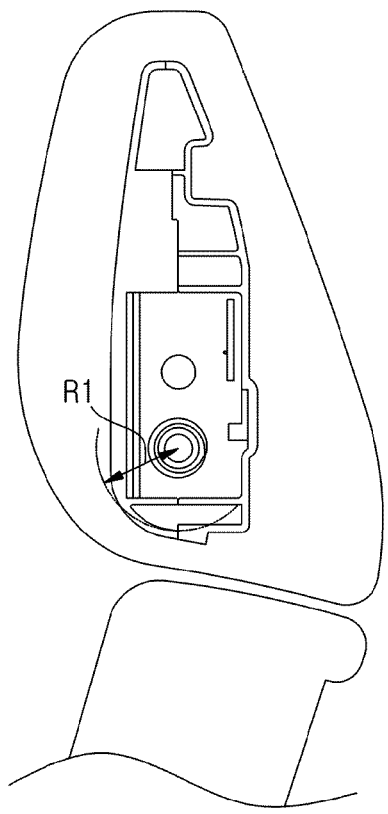
(a)
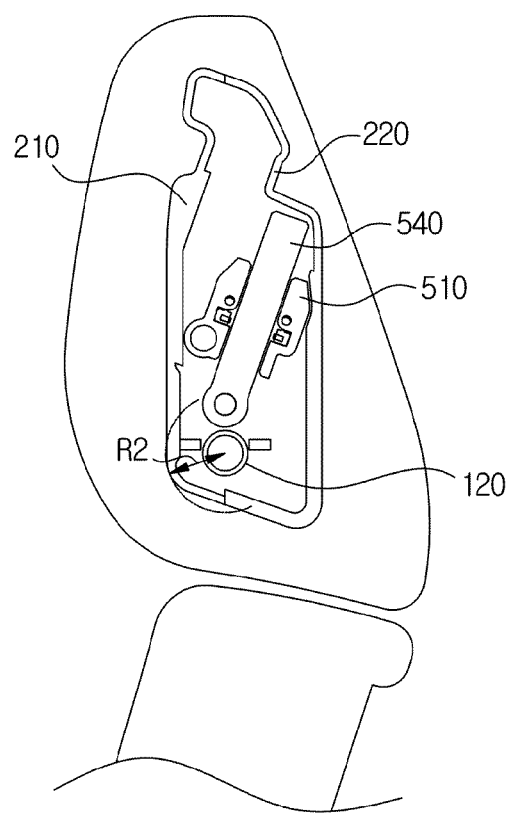
(b)

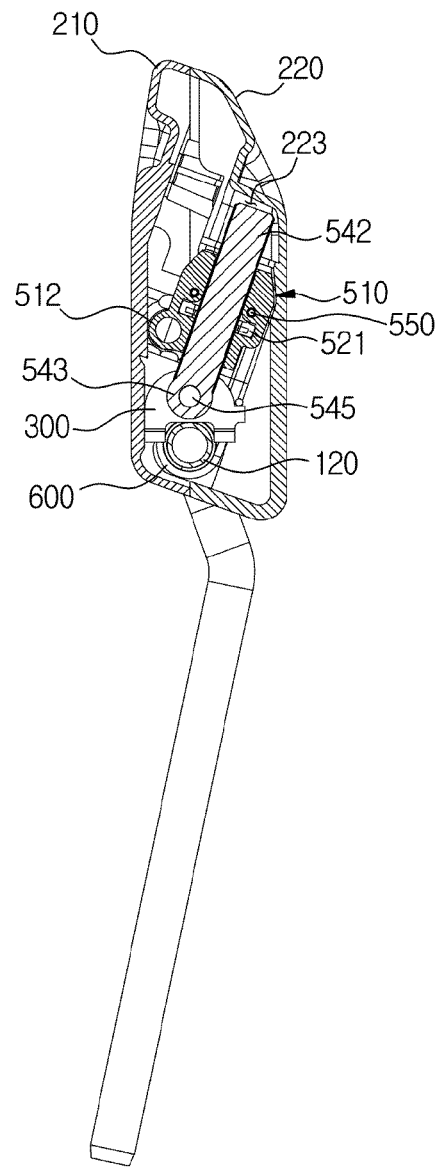

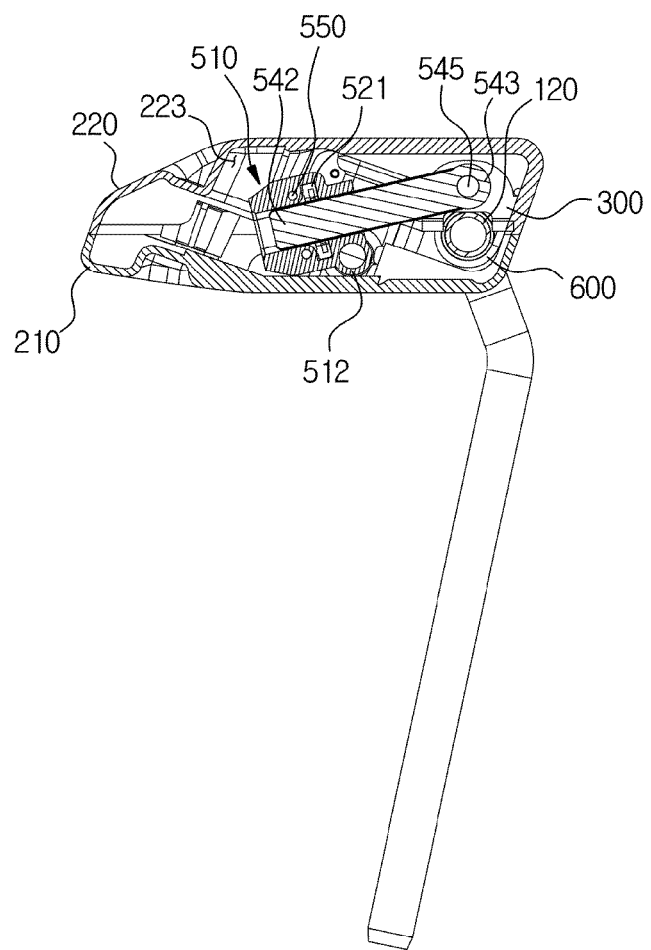
[Fig. 11]

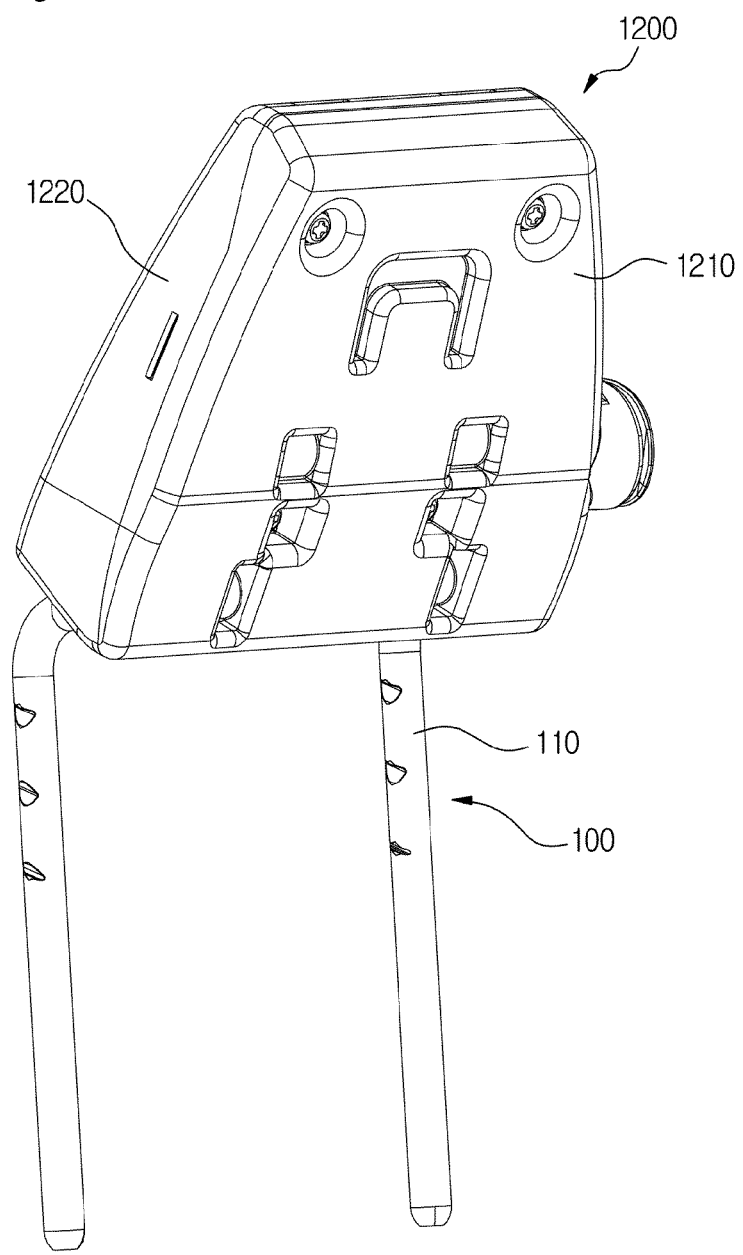
[Fig. 12]

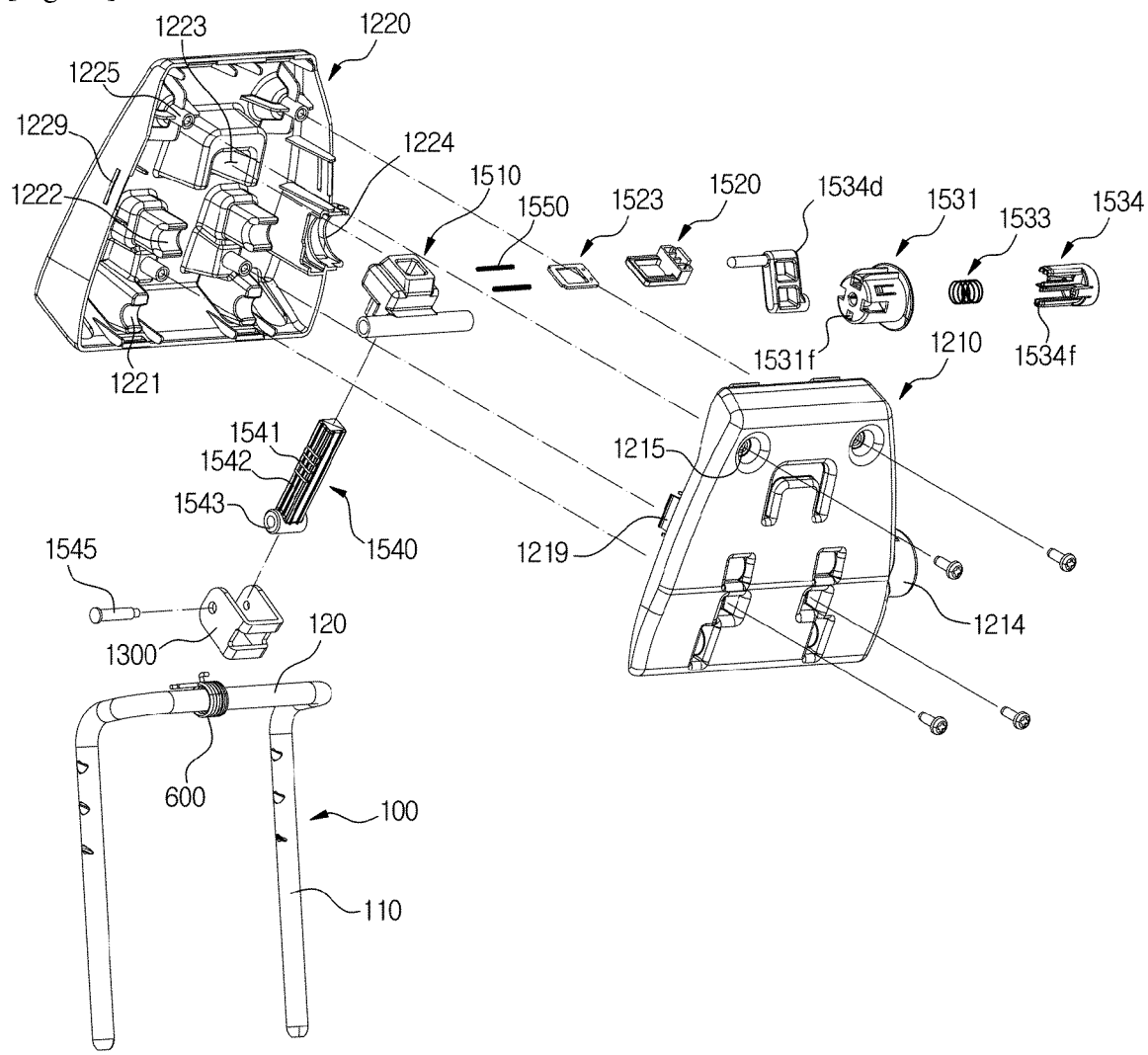
[Fig. 13]

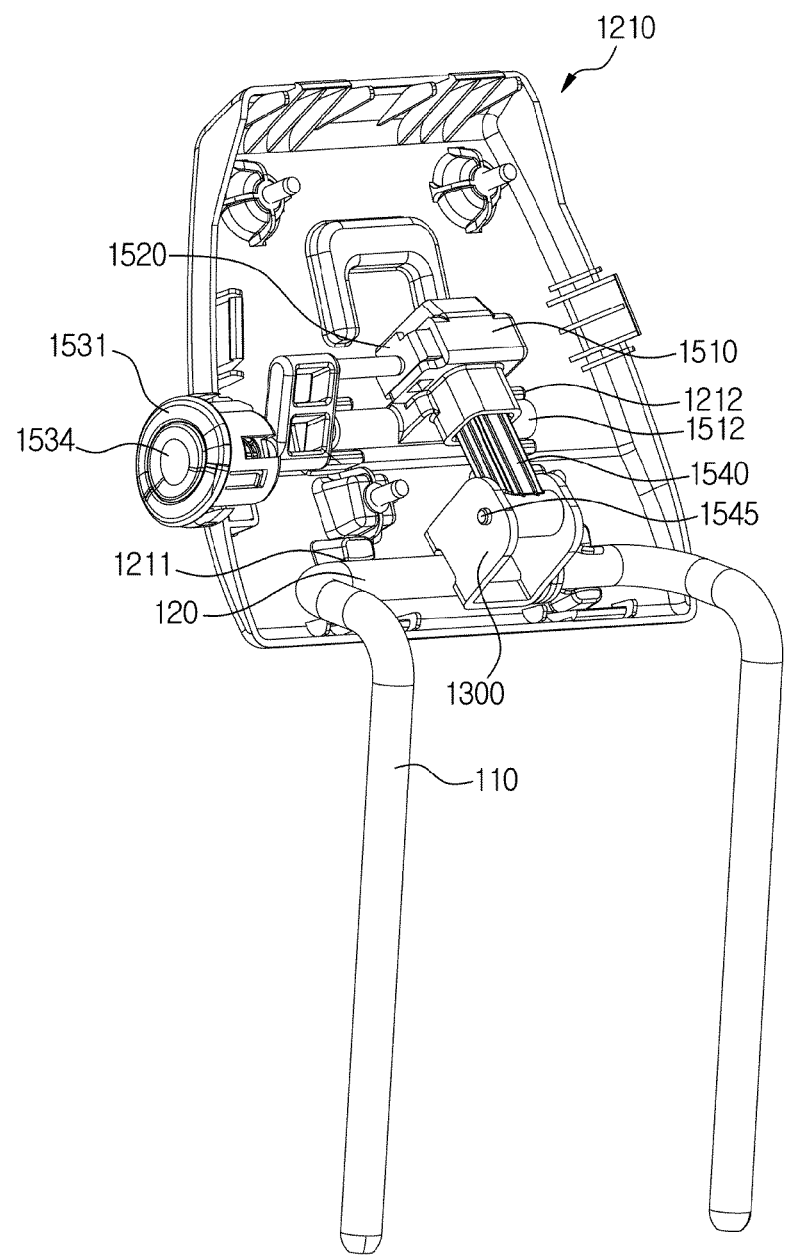
[Fig. 14]

[Fig. 15]
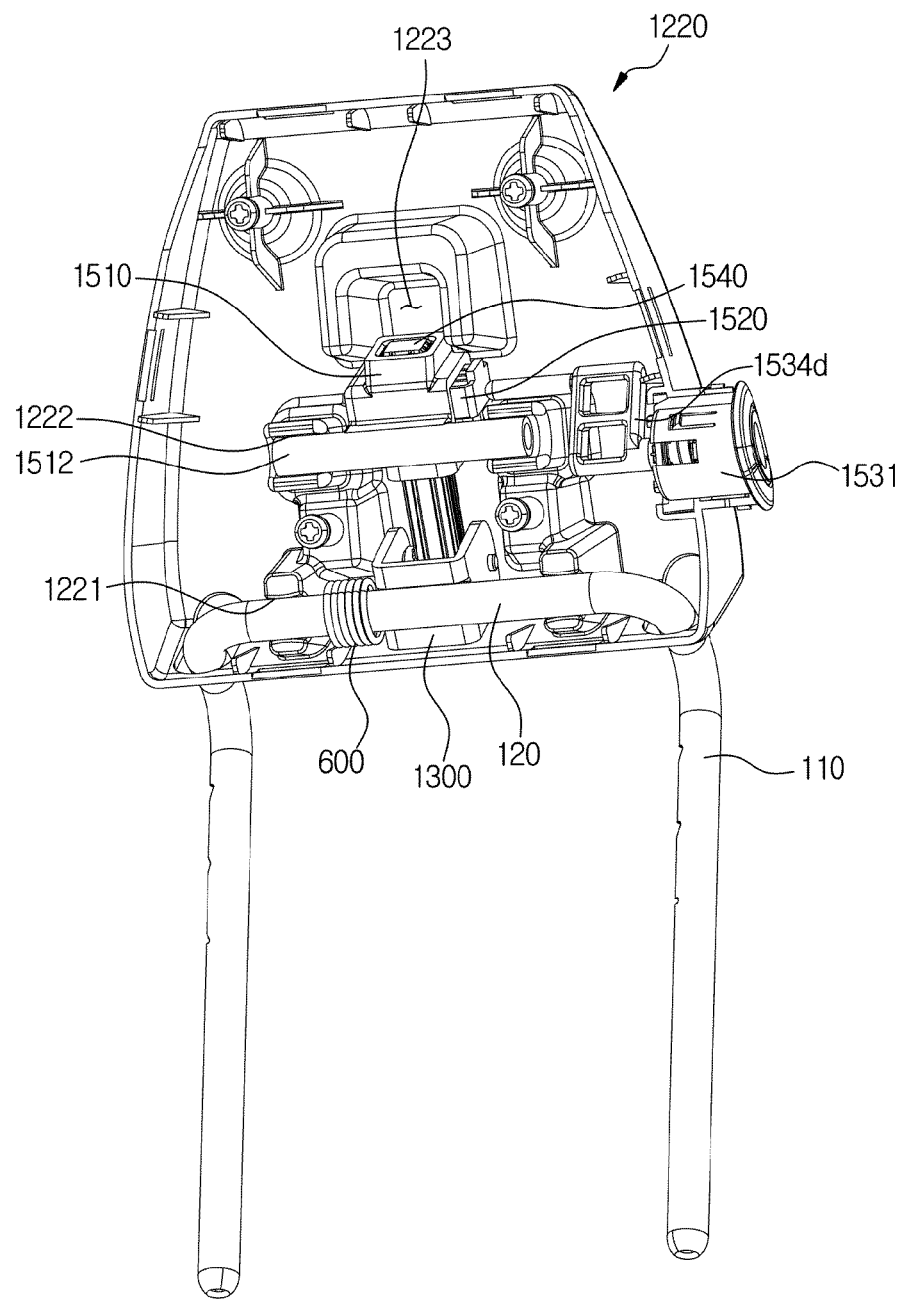

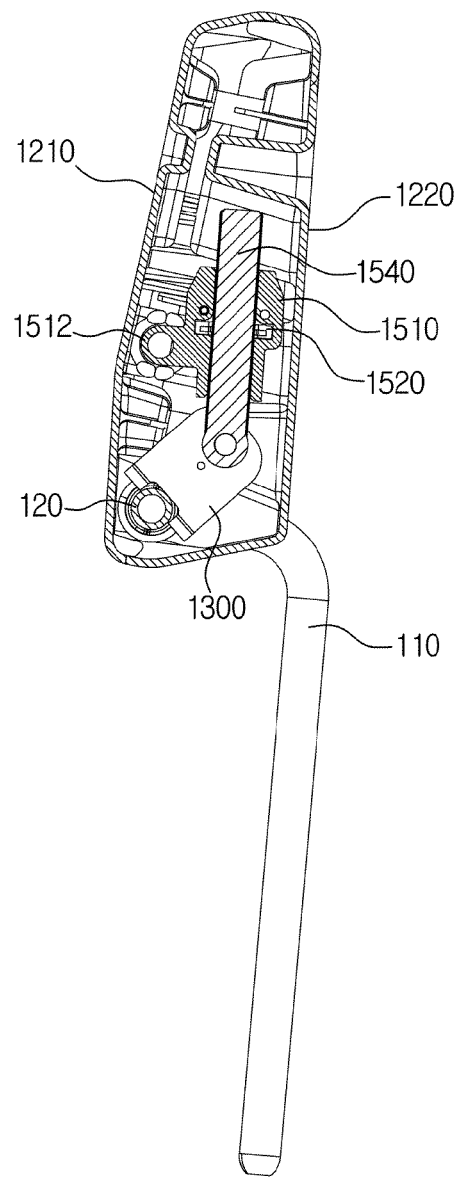
[Fig. 16]

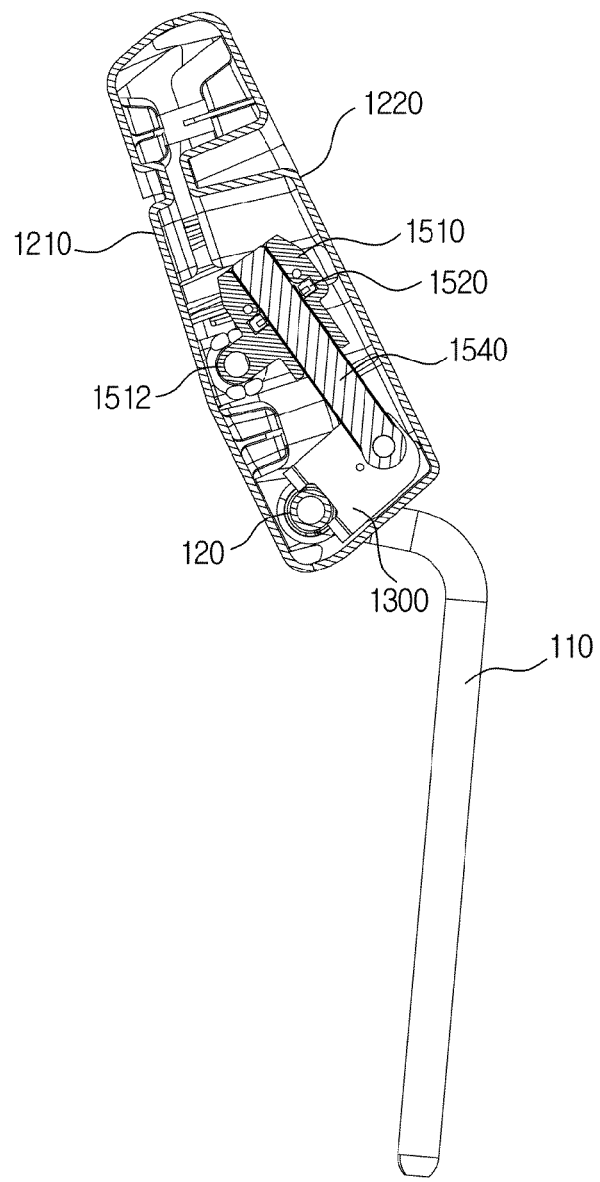
[Fig. 17]

HEADREST CONTROLLING APPARATUS

This application is the national phase entry of international patent application no. PCT/KR2018/006812 filed Jun. 18, 2018 and claims the benefit of Korean patent application No. 10-2017-0124342, filed September 2017, the disclosures of which are incorporated herein by reference in their entirety.

TECHNICAL FIELD

The present invention relates to an apparatus for controlling a position or angle of a headrest.

BACKGROUND ART

Generally, a vehicle headrest is installed at an upper end of a back rest of a seat to function as a pillow that comfortably supports a head of a passenger at normal times and to prevent a neck injury and the like by supporting the head not to be sharply tilted back when an accident is caused, and among conventional headrests, its position can be controlled by rotating or tilting a headrest that supports a head according to convenience of a passenger.

The conventional headrests are disclosed in Korean Patent Laid-Open Publication No. 10-1171234, Korean Patent Laid-Open Publication No. 10-1044067, Korean Patent Laid-Open Publication No. 10-1071615, Korean Patent Laid-Open Publication No. 10-0982796, and the like.

An apparatus for tilting a headrest is disclosed in Korean Patent Laid-Open Publication No. 10-1171234 (hereinafter, referred to as 'Patent Document 1'). The headrest-moving apparatus in Patent Document 1 includes a first link installed at a stay rod of a headrest, a second link and a third link rotatably installed at the first link, a fourth link rotatably installed at the second link and the third link, and a control member having one end rotatably connected to the first link or the third link and the other end rotatably connected to the fourth link or the second link, and the control member includes a rod including a notch, a guide having a first through hole through which the rod passes, a pushing part slidably installed in the guide, having a second through hole into which the rod is inserted, and inserted into or separated from the notches to control moving of the rod in the guide, and a spring applying elastic force to the pushing part. However, the headrest-moving apparatus in Patent Document 1 should include first to fourth links because a cover is installed at the fourth link Thus, the number of components remarkably increases, and there are problems of difficult assembling, an increase in weight of the apparatus, and high manufacturing costs.

An apparatus for folding a headrest is disclosed in Korean Patent Laid-Open Publication No. 10-0982796 (hereinafter, referred to as 'Patent Document 2'). The headrest in Patent Document 2 includes a ratchet member axially coupled to a horizontal part of a stay rod, a rotating member having axial holes which are formed at lower portions of both plates thereof and into which the horizontal part is coupled so that an inner surface of one plate thereof is in contact with the ratchet member, a return spring coupled to the horizontal part to be interposed between an inner surface of the ratchet member and an inner surface of the other plate of the rotating member, having an inner end caught on the ratchet member and an outer end caught on the rotating member so that elasticity is applied as a force that lays the rotating member down, a braking member axially coupled to a fixing shaft having both ends fixed to upper portions of the both plates to be positioned directly above the ratchet member, braking the rotating member to be upright when being caught on the ratchet member, and laying the rotating member down by elasticity of the return spring when not being caught on the ratchet member, a braking spring coupled to the fixing shaft, having one end caught on the braking member and the other end caught on the rotating member to maintain a catching state of the ratchet member, and a releasing member releasing the catching state of the braking member. The headrest in Patent Document 2 rotates about the horizontal part of the stay rod. The headrest in Patent Document 2 separately includes a horizontal part and a vertical part of the stay rod so that the headrest is assembled with the stay rod using an axial hole formed at the rotating member so that the horizontal part of the stay rod is inserted thereinto, and should connect the horizontal part with the vertical part after the assembling. Therefore, the headrest in Patent Document 2 has an extremely complicated assembling process, cannot be applied to the conventional stay rod, and should have a thin cushion formed at a front lower edge portion of the headrest due to an increased distance from the stay rod to the front lower edge of the apparatus. Further, since the headrest in Patent Document 2 should separately include a rotating member connected with the cover, the number of components is increased.

PRIOR-ART DOCUMENTS

Patent Documents (Patent Document 1) Korean Patent Laid-Open Publication No. 10-1171234

(Patent Document 2) Korean Patent Laid-Open Publication No. 10-1044067

(Patent Document 3) Korean Patent Laid-Open Publication No. 10-1071615

(Patent Document 4) Korean Patent Laid-Open Publication No. 10-0982796

DISCLOSURE OF INVENTION

Technical Problem

A technical objective of the present invention is to reduce the number of components, minimize a distance from a stay rod to a front lower edge of the apparatus, easily assemble the apparatus due to a modularized bracket and locking member, and facilitate operation due to increased precision of the locking member.

Solution to Problem

A headrest controlling apparatus according to the present invention includes: a headrest cover; a bracket installed on a stay rod; and a locking member installed in the bracket to fix a position of a headrest, wherein the headrest cover includes a stay rod coupling part to which the stay rod is rotatably coupled.

In the headrest controlling apparatus according to the present invention, it is characterized that the stay rod coupling part may include a through hole into which the stay rod is inserted, the headrest cover may be divided into at least a first headrest cover and a second headrest cover, and the through hole may be divided and formed at the first headrest cover and the second headrest cover.

In the headrest controlling apparatus according to the present invention, it is characterized that the locking member may include a guide rod rotatably installed in the bracket, a sliding member slidably installed on the guide rod, and a fixing part allowing the sliding member to move or not to move on the guide rod.

In the headrest controlling apparatus according to the present invention, it is characterized that the fixing part may include a notch formed in the guide rod and a moving member slidably installed on the sliding member and having a catching part inserted into the notches.

In the headrest controlling apparatus according to the present invention, it is characterized that the sliding member may include a sliding groove in which the moving member slides, one of the moving member and the sliding member may include a hook, and the other one of the moving member and the sliding member may have a long hole into which the hook is inserted.

In the headrest controlling apparatus according to the present invention, it is characterized that the stay rod coupling part may include a through hole into which the stay rod is inserted, and the stay rod coupling part may include at least one separation part so that the through hole communicates with the outside.

Advantageous Effects of Invention

The above-described headrest controlling apparatus has the following effects.

The headrest controlling apparatus includes a headrest cover, a bracket installed on a stay rod, and a locking member installed in the bracket to fix a position of a headrest, wherein the headrest cover includes a stay rod coupling part to which the stay rod is rotatably coupled, and thus can minimize a distance from the stay rod to a front lower edge of the apparatus, can be easily assembled due to the modularized bracket and locking member, can be easily operated due to increased precision of the locking member because the locking member is installed in one member (the bracket) and not separately at various members, and can reduce manufacturing costs and the entire weight due to the decreased number of components.

The stay rod coupling part includes a through hole into which the stay rod is inserted, the headrest cover is divided into a first headrest cover and a second headrest cover, and the through hole is divided and formed in the first headrest cover and the second headrest cover. Thus, the stay rod can be easily assembled to the stay rod coupling part without separation of a horizontal portion and a vertical portion of the stay rod.

The locking member includes a guide rod rotatably installed in the bracket, a sliding member slidably installed on the guide rod, and a fixing part allowing the sliding member to move or not to move on the guide rod, and the sliding member is rotatably installed in the headrest cover, and thus a structure of the apparatus can be simplified and operation can be facilitated.

The fixing part includes a notch formed in the guide rod, and a moving part slidably installed on the sliding member and having a catching part inserted into the notches, and thus a structure of the apparatus can be more simplified.

The sliding member includes a sliding groove in which the moving member slides, one of the moving member and the sliding member includes a hook, and the other one of the moving member and the sliding member has a long hole into which the hook is inserted, and thus the moving member can be easily assembled to the sliding member.

BRIEF DESCRIPTION OF DRAWINGS

FIG. 1 is a perspective view of a headrest controlling apparatus according to a first embodiment of the present invention.

FIG. 2 is a perspective view showing a disassembled state of the headrest controlling apparatus according to the first embodiment of the present invention when viewed from a front side.

FIG. 3 is a perspective view showing a disassembled state of the headrest controlling apparatus according to the first embodiment of the present invention when viewed from a rear side.

FIG. 4 is a perspective view of the headrest controlling apparatus according to the first embodiment of the present invention when viewed from the front side (a first headrest cover is omitted).

FIG. 5 is a perspective view of the headrest controlling apparatus according to the first embodiment of the present invention when viewed from a rear side (a second headrest cover is omitted).

FIG. 6 is a perspective view of a locking member of the headrest controlling apparatus according to the first embodiment of the present invention when viewed from the front side.

FIG. 7 is a perspective view of the locking member of the headrest controlling apparatus according to the first embodiment of the present invention when viewed from the rear side.

FIG. 8 is a vertical cross-sectional view of the locking member of the headrest controlling apparatus according to the first embodiment of the present invention.

FIG. 9 is a cross-sectional view showing distances from the stay rods of a conventional headrest folding apparatus and the headrest controlling apparatus according to the first embodiment of the present invention to the front lower edges of the apparatuses.

FIG. 10 is a cross-sectional view of the headrest controlling apparatus according to the first embodiment of the present invention (an upright state).

FIG. 11 is a cross-sectional view of the headrest controlling apparatus according to the first embodiment of the present invention (a folded state).

FIG. 12 is a perspective view of a headrest controlling apparatus according to a second embodiment of the present invention.

FIG. 13 is a perspective view showing a disassembled state of the headrest controlling apparatus according to the second embodiment of the present invention when viewed from a front side.

FIG. 14 is a perspective view of the headrest controlling apparatus according to the second embodiment of the present invention when viewed from a rear side (a second headrest cover is omitted).

FIG. 15 is a perspective view of the headrest controlling apparatus according to the second embodiment of the present invention when viewed from the front side (a first headrest cover is omitted).

FIG. 16 is a cross-sectional view of the headrest controlling apparatus according to the second embodiment of the present invention (an upright state).

FIG. 17 is a cross-sectional view of the headrest controlling apparatus according to the first embodiment of the present invention (a tilted state).

MODE FOR THE INVENTION

Hereinafter, exemplary embodiments of the present invention will be described in detail with reference to the accompanying drawings.

For reference, the components of the present invention which are the same as those in the related art will be described below with reference to the above-described related art, and the detailed description thereof will be omitted.

When it is described that any part is positioned "on" another part, it means that the part is directly on another part or above another part with at least one intervening part. In contrast, when any part is described to be positioned "directly on" another part, it means that there is no intervening part between the two parts.

Technical terms used herein are for only describing specific embodiments and are not intended to limit the present invention. Singular forms used herein include plural forms unless explicitly described to the contrary. A meaning of "comprising" used in the specification embodies specific characteristics, areas, integers, steps, operations, elements, and/or components, and does not exclude the presence or addition of other characteristics, areas, integers, steps, operations, elements, and/or components.

Terms representing a relative space such as "lower," "upper," and the like may be used for more easily describing a relationship with another part of a part shown in the drawings. Such terms are intended to include other meanings or operations of an apparatus used together with a meaning that is intended in the drawings. For example, when an apparatus is inverted in the drawings, any part described as disposed at a "lower" part of another part is described as being disposed at an "upper" part of another part. Therefore, the illustrative term "lower" includes both upper and lower directions. An apparatus may be rotated by 90° or another angle, and the terms representing the relative space are accordingly analyzed.

When it is described that any element is "connected" to another element, it should be understood that the element is directly connected to another element or still another element may be interposed therebetween.

First Embodiment

A headrest controlling apparatus according to a first embodiment of the present invention is an apparatus for folding a headrest.

As shown in FIGS. 1 to 11, the headrest controlling apparatus of the first embodiment of the present invention includes a headrest cover 200, a bracket 300 installed on a stay rod 100, and a locking member installed in the bracket 300 to fix a position of the headrest, and the headrest cover 200 includes a stay rod coupling part to which the stay rod 100 is rotatably coupled.

Hereinafter, a width direction of a vehicle is referred to as a lateral direction, a longitudinal direction of the vehicle is referred to as a front-rear direction, and a vertical direction of the vehicle is referred to as a vertical direction. Specifically, a side adjacent to a head of a passenger is referred to as a front side, and the opposite side is referred as a rear side.

As shown in FIG. 1, the headrest cover 200 is formed to correspond to a headrest shape. In the headrest, the headrest cover 200 is surrounded by a cushion (not shown).

The headrest cover 200 is made of a synthetic resin and is manufactured in an injection-molding manner or the like.

The headrest cover 200 includes a front surface, a rear surface, an upper surface, a lower surface, and both side surfaces, and covers a second rod 120 of the stay rod 100 described below and upper and lower portions and front and rear sides of the locking member.

As shown in FIGS. 2 to 5, the stay rod 100 includes a first rod 110 disposed in a vertical direction and the second rod 120 horizontally disposed at an upper portion of the first rod 110 in a lateral direction. The first rod 110 and the second rod 120 may be integrally formed or may be separately formed. An inclined part 111 is formed at an upper end of the first rod 110 so that the second rod 120 is disposed forward of the first rod 110.

The headrest cover 200 is divided into at least a first headrest cover 210 and a second headrest cover 220.

The first headrest cover 210 is disposed in front of the second headrest cover 220. That is, a front surface of the headrest cover 200 is formed at the first headrest cover 210, and a rear surface of the headrest cover 200 is formed at the second headrest cover 220. Upper and lower surfaces and side surfaces of the headrest cover 200 may be formed only at any one of the first headrest cover 210 and the second headrest cover 220 or may be separately formed at both sides.

Each of the first headrest cover 210 and the second headrest cover 220 is integrally formed.

The stay rod coupling part to which the second rod 120 of the stay rod 100 is rotatably coupled is formed in the headrest cover 200. That is, the headrest cover 200 is directly connected to the stay rod 100 in a rotatable manner. As shown in FIG. 9, the stay rod 100 is directly connected to the headrest cover 200, and thus a distance R2 from a center of the second rod 120 to a front lower edge of the apparatus is shorter than a distance R1 from a center of a second rod of an conventional folding apparatus including an rotating member to a front lower edge of the apparatus.

The stay rod coupling part has a through hole formed to pass therethrough in a lateral direction so that the second rod 120 is inserted thereinto.

The stay rod coupling part includes at least one separation part to allow the through hole to communicate with the outside. The separation part allows the second rod 120 to be inserted into the through hole, and thus the second rod 120 may be coupled to the headrest cover 200 without separation of the first rod 110 and the second rod 120.

The stay rod coupling part is divided and formed in the first headrest cover 210 and the second headrest cover 220. That is, the stay rod coupling part is divided into a first stay rod coupling part 211 and a second stay rod coupling part 221. The first stay rod coupling part 211 is integrally formed in the first headrest cover 210, and the second stay rod coupling part 221 is integrally formed in the second headrest cover 220. The first stay rod coupling part 211 is disposed in front of the second rod 120, the second stay rod coupling part 221 is formed behind the second rod 120. Therefore, the stay rod coupling part includes two separation parts, and the separation parts are formed at an upper portion and a lower portion of the stay rod coupling part. Thus, the through hole is divided and formed in the first headrest cover 210 and the second headrest cover 220. A portion of the through hole formed in the first stay rod coupling part 211 has an open rear side, and the other portion of the through hole formed in the second stay rod coupling part 221 has an open front side.

The first stay rod coupling part 211 and the second stay rod coupling part 221 are coupled to each other when the first headrest cover 210 and the second headrest cover 220 are coupled to each other.

The stay rod coupling parts are formed in both lower portions of the first headrest cover 210 and the second headrest cover 220.

The first headrest cover 210 and the second headrest cover 220 include first and second fastening parts 215 and 225, and thus the first headrest cover 210 and the second headrest cover 220 are coupled to each other. A bolt is fastened to each of the first and second fastening parts 215 and 225.

The headrest cover 200 includes a sliding member coupling part formed therein. The sliding member coupling part is disposed above the stay rod coupling part. The sliding member coupling part includes an insertion groove having one closed side and the other open side formed in a lateral direction. The sliding member coupling part allows a sliding member 510 described below not to move in the headrest cover 200 in a lateral direction. A vertical cross-section of the front-rear insertion groove has a circular shape.

The sliding member coupling part is divided and formed in the first headrest cover 210 and the second headrest cover 220. Thus, one sliding member coupling part includes a first sliding member coupling part 212 and a second sliding member coupling part 222. The first sliding member coupling part 212 is disposed in front of the second sliding member coupling part 222.

The insertion groove is also divided and formed in the first sliding member coupling part 212 and the second sliding member coupling part 222. Thus, a portion of the insertion groove formed in the first sliding member coupling part 212 has an open rear side, and the other portion of the insertion groove formed in the second sliding member coupling part 222 has an open front side.

The first sliding member coupling part 212 and the second sliding member coupling part 222 are coupled to each other when the first headrest cover 210 and the second headrest cover 220 are coupled to each other.

The sliding member coupling parts are formed at the centers of both sides of the first headrest cover 210 and the second headrest cover 220.

The headrest cover 200 includes a locking member moving space 223 formed between the sliding member coupling parts at both sides thereof. The locking member moving space 223 includes the locking member disposed therein to allow the locking member to easily rotate with respect to the headrest cover 200.

The locking member moving space 223 has a groove shape with an open front side and is formed in the second headrest cover 220. Alternatively, the locking member moving space 223 may be divided and formed in the first headrest cover 210 and the second headrest cover 220.

Further, the headrest cover 200 includes a reinforcing rib formed therein at a portion that is in contact with the sliding member 510 when the headrest is upright or folded.

Incised parts are formed in a lower surface and a front lower end of the headrest cover 200 so that the first rod 110 is inserted thereinto. The incised parts are formed in both ends of the headrest cover 200. The headrest cover 200 does not interfere with the first rod 110 when the headrest is folded through the incised parts. The incised parts are divided into a first incised part 216 formed in the first headrest cover 210 and a second incised part 226 formed in the second headrest cover 220.

Further, a bracket insertion part 219 to be described below into which a front side of the bracket 300 is inserted is formed at a rear surface of the first headrest cover 210. The bracket insertion part 219 is disposed between the first stay rod coupling parts 211 at both sides of the first headrest cover 210.

The bracket insertion part 219 includes a bracket insertion groove with open upper and rear sides formed therein so that a front side of the bracket 300 is inserted thereinto. The bracket insertion part 219 allows the bracket 300 and the locking member to be easily and temporarily assembled to the first headrest cover 210.

Further, a button member installation part 224 is formed at a side surface of the second headrest cover 220. The button member installation part 224 has a button member through hole formed to pass therethrough in a lateral direction.

The bracket 300 is fixed to the center of an upper portion of the second rod 120 of the stay rod 100. The bracket 300 is made of a metal material and may be installed on the second rod 120 through welding and the like.

The bracket 300 includes a bottom plate 310 fixed to the center of the second rod 120, and side plates 321 vertically formed at both sides of the bottom plate 310.

The bracket 300 is installed on the second rod 120 so that the bottom plate 310 is horizontally disposed.

A second rod mounting part 322 on which the second rod 120 is mounted is formed at a lower end of the bracket 300. The second rod mounting part 322 is formed so as to pass through in a lateral direction. The second rod mounting part 322 is formed at a lower portion of the bottom plate 310 and lower portions of the side plates 321. That is, the second rod mounting part 322 has open upper and lower portions. Thus, the lower end of the bracket 300 is disposed lower than an upper end of the second rod 120 and higher than a lower end of the second rod 120. Further, the second rod mounting part 322 allows a contact area between the bracket 300 and the second rod 120 to be maximized.

A main spring 600 is disposed at a left side of the bracket 300. The main spring 600 allows the headrest cover 200 to return to an original position (a folding position). The main spring 600 includes a coil part 603 in a coil shape, a first tip end 601 formed at one end of the coil part 603, and a second tip end 602 formed at the other end of the coil part 603. The coil part 503 is fitted onto the second rod 120.

A second main spring catching part 301 is formed at a rear side of one side plate 321 to protrude rearward. The second tip end 602 is caught by the second main spring catching part 301. The first tip end 601 is caught by a first main spring catching part (not shown) formed at the second headrest cover 220.

First hinge through holes are formed to pass through the side plates 321 on both sides of the bracket 300 in a lateral direction. The first hinge through holes are spaced upward from the second rod mounting part 322.

The locking member is directly installed in the bracket 300 to fix a position of the headrest. Further, the locking member is intensively installed in the bracket 300 to increase the precision of the locking member.

As shown in FIGS. 2 and 3 and FIGS. 6 to 8, the locking member includes a guide rod 540 rotatably installed in the bracket 300, the sliding member 510 slidably installed on the guide rod 540, and a fixing part allowing the sliding member 510 to move or not to move on the guide rod 540.

The fixing part of the embodiment of the present invention includes a notch 541 formed in the guide rod 540 and a moving member 520 slidably installed on the sliding member 510 and having a catching part 521 for insertion into the notch 541. Alternatively, as disclosed in Korean Patent Laid-Open Publication No. 2011-0029765, the fixing part may include a cylinder, a piston, and an opening and closing member.

The guide rod 540 includes a rod main body 542 with a polygonal horizontal cross-section and a bracket coupling part 543 formed at a lower end of the rod main body 542 in a cylindrical shape.

A plurality of fine protrusions are formed at an outer circumferential surface of the rod main body 542 in a vertical direction to minimize friction.

Further, the notch 541 is formed in one side of the rod main body 542, wherein at least two notches 541 are formed at predetermined intervals. The notches 541 are formed by a horizontal surface and an inclined surface. The headrest controlling apparatus of the embodiment of the present invention is a folding apparatus, and thus has two notches 541. The notch 541 which maintains an upright state has an inclined surface disposed at an upper portion thereof, and the notch 541 which maintains a folding state has an inclined surface disposed at a lower portion thereof. That is, the notch 541 disposed at a lower portion of the rod main body 542 has an inclined surface disposed at the upper portion thereof, and the notch 541 disposed at the lower portion of the rod main body 542 has an inclined surface disposed at a lower portion thereof.

The bracket coupling part 543 has a second hinge through hole formed in a lateral direction. A hinge 545 is inserted into the first hinge through hole and the second hinge through hole. Therefore, the bracket coupling part 543 is rotatable with respect to the bracket 300.

The sliding member 510 includes a first through hole 511 vertically passing therethrough so that the rod main body 542 is inserted thereinto.

A cover coupling part 512 is formed at a front lower portion of the sliding member 510. The cover coupling part 512 protrudes in a lateral direction and has a cylindrical shape. Both sides of the cover coupling part 512 are inserted into first sliding member coupling parts 212 and 222. Therefore, the sliding member 510 is rotatably installed in the headrest cover 200.

The center of the cover coupling part 512 is disposed forward of the first through hole 511.

Both ends of the cover coupling part 512 are caught by the first sliding member coupling parts 212 and 222 so as not to move in a lateral direction.

When the headrest is upright, a shaft of the cover coupling part 512 is disposed forward and upward of shafts of the second rod 120 and the hinge 545. When the headrest is upright, an upper end of the rod main body 542 is disposed backward of a lower end thereof in an inclined manner.

The sliding member 510 includes a sliding groove 513 in which the moving member 520 slides. The sliding groove 513 is formed in a lateral direction and has an open side, which is adjacent to a button member 530 described below, and the opposite side is closed. The sliding groove 513 is formed to communicate with the first through hole 511.

The sliding member 510 includes two spring insertion parts 519 into which moving member springs 550 for returning the moving member 520 are inserted. The spring insertion parts 519 are formed in a lateral direction and disposed in the sliding groove 513. The two spring insertion parts 519 are disposed at a front side and a rear side of the sliding groove 513. The spring insertion parts 519 include spring through holes formed in a lateral direction so that the moving member springs 550 provided as coil springs pass therethrough. The spring insertion parts 519 are disposed at a front side and a rear side of the first through hole 511. A left end of the spring insertion part 519 is separated from an inner wall of the sliding member 510. The spring insertion part 519 allows the moving member spring 550 to be stably installed. Further, the spring insertion part 519 is separated from a bottom surface forming the sliding groove 513 and guides the catching part 521 of the moving member 520.

A left end of the moving member spring 550 is supported by the inner wall of the sliding member 510. A right end of the moving member spring 550 is supported by the moving member 520. That is, the moving member spring 550 is disposed between the sliding member 510 and the moving member 520.

As shown in FIG. 8, a hook 526 is formed in any one of the moving member 520 and the sliding member 510, and a long hole 518 is formed in the other one. The long hole 518 communicates with the sliding groove 513. Alternatively, the long hole 518 may be formed so as not to communicate with the sliding groove 513. In the embodiment of the present invention, the hook 526 protrudes downward from a lower surface of the moving member 520, and the long hole 518 is formed long in the sliding member 510 in a lateral direction. The long hole 518 is formed to vertically pass through. The long hole 518 is formed in a protrusion plate formed by extending a lower end of the sliding member 510 to the right. Therefore, even when the sliding member 510 is injection-molded, the long hole 518 may be easily formed. When the moving member 520 is push-inserted into the sliding groove 513 in the event of assembling, the hook 526 is inserted into the long hole 518. Even when the moving member 520 receives an elastic force of the moving member spring 550 due to the hook 526 and the long hole 518, the moving member 520 does not escape from the sliding member 510 after the assembling.

The moving member 520 includes the catching part 521 and a spring supporting part 522 formed at a right side of the catching part 521.

The catching part 521 and the spring supporting part 522 are inserted into the sliding groove 513.

The catching part 521 includes a second through hole 524 vertically passing therethrough so that the rod main body 542 is inserted thereinto.

A reinforcing member 523 is formed in the catching part 521 in an insert-injection molding manner. Alternatively, the reinforcing member 523 may be assembled to the catching part 521. The catching part 521 may be formed of a synthetic resin, and the reinforcing member 523 may be formed of a metal material. The reinforcing member 523 has a rectangular ring shape to surround the second through hole 524. At least a part of the reinforcing member 523 is exposed at the outside so that the reinforcing member 523 is inserted into and caught by the notch 541. Preferably, a left inner portion of the reinforcing member 523 is exposed, and the remaining portion is disposed in the catching part 521, and thus friction between the moving member 520 and the other member can be minimized, and stiffness of a portion caught by the notch 541 can be maximized.

The spring supporting part 522 protrudes above the catching part 521, and a left surface of the spring supporting part 522 is formed flat so as to support a right end of the moving member spring 550.

A right surface of the spring supporting part 522 is also formed flat so as to easily come in contact with the button member 530 described below.

A protrusion 525 protrudes upward from an upper end of the right surface of the spring supporting part 522. The protrusion 525 is caught by the sliding member 510.

The headrest controlling apparatus of the embodiment of the present invention further includes the button member 530 so that a user easily moves the moving member 520 at the outside.

The button member 530 includes a bezel 531, a button 534 fitted onto the bezel 531, and a button spring 533 for returning the button 534.

The bezel 531 includes a bezel body 531d and a bezel flange 531e surrounding one end of the bezel body 531d.

The bezel body 531d includes a supporting surface for supporting one end of the button spring 533 and a wall surrounding the supporting surface.

A button rod guide part 531b is formed in a central portion of the supporting surface. The button rod guide part 531b includes a guide hole formed to pass therethrough in a lateral direction so that a push rod 534d and a guide piece 534c are inserted thereinto. The button rod guide part 531b allows the button 534 to easily slide on the bezel 531 and not to rotate with respect to the bezel 531.

Further, a plurality of fastening long holes 531c are formed long in the wall in a lateral direction.

A plurality of first fastening hooks 531a, which are elastically deformed, are formed at the wall. The first fastening hooks 531a are fastened to fastening holes (not shown) formed in the first headrest cover 210 or the second headrest cover 220. The first fastening hooks 531a allow the button member 530 to be easily coupled to the headrest cover 200.

The button 534 includes a pushing part 534a having a plate shape and the push rod 534d protruding from the pushing part 534a toward a left side.

A second fastening hook 534b protrudes from an edge of the pushing part 534a toward the left side. The second fastening hook 534b is inserted into the fastening long hole 531c. Therefore, the button 534 slides on the bezel 531 in a lateral direction and does not escape from the bezel 531.

The push rod 534d is not connected with the spring supporting part 522, but is separated from the spring supporting part 522. Therefore, even when the spring supporting part 522 moves in a front-rear direction with respect to the push rod 534d, a pushing force of a user is easily transmitted to the moving member 520.

A guide piece 534c protrudes from an outer circumferential surface of the push rod 534d in a longitudinal direction.

The button spring 533 is disposed between the bezel 531 and the button 534.

The button spring 533 is provided as a coil spring, and is installed to surround the push rod 534d.

An outer side of the button spring 533 is surrounded by a button spring sleeve 532. That is, a spring sleeve 532 is disposed between the button spring 533 and the bezel body 531d.

Hereinafter, operation of the embodiment of the present invention having the above-described configuration will be described.

When a user pushes a button 534 of a button member 530 to fold the upright headrest shown in FIG. 10, the spring supporting part 522 of the moving member 520 which is in contact with the push rod 534d of the button 534 is also pushed.

When the moving member 520 is pushed, the reinforcing member 523 of the catching part 521 inserted into the notch 541 escapes from the notch 541.

Thus, when the reinforcing member 523 escapes from the notch 541, the sliding member 510 may move on the rod main body 542. That is, the headrest cover 200 is rotatable about the second rod 120 of the stay rod 100. Therefore, an angle of the headrest can be controlled.

When a force pushing the button 534 is removed, the button 534 and the moving member 520 are returned to the original position by the button spring 533 and the moving member spring 550.

The headrest rotates to a folding position (a counterclockwise direction) by the elastic force of the main spring 600.

As shown in FIG. 11, when the headrest rotates to the folding position, the reinforcing member 523 is inserted into the notch 541, and thus a position of the headrest is fixed.

Second Embodiment

A headrest controlling apparatus according to a second embodiment of the present invention is an apparatus for tilting a headrest.

As shown in FIGS. 12 to 17, the headrest controlling apparatus according to the second embodiment of the present invention includes a headrest cover 1200, a bracket 1300 installed on a stay rod 100, and a locking member installed in the bracket 1300 to fix a position of the headrest. The headrest cover 1200 includes a stay rod coupling part to which the stay rod 100 is rotatably coupled, and at least three notches 1541 are formed in a guide rod 1540 of the locking member.

Detailed descriptions of the same components as those of the above-described embodiment of the invention will be omitted.

As shown in FIGS. 12 to 15, the headrest cover 1200 is divided into at least a first headrest cover 1210 and a second headrest cover 1220 disposed behind the first headrest cover 1210.

The stay rod coupling part to which a second rod 120 of the stay rod 100 is rotatably coupled is formed in the headrest cover 1200.

The stay rod coupling part includes a through hole passing therethrough in a lateral direction so that in the second rod 120 is inserted thereinto.

The stay rod coupling part is divided into a first stay rod coupling part 1211 and a second stay rod coupling part 1221. The first stay rod coupling part 1211 is integrally formed in the first headrest cover 1210, and the second stay rod coupling part 1221 is integrally formed in the second headrest cover 1220.

The first stay rod coupling part 1211 and the second stay rod coupling part 1221 are coupled to each other when the first headrest cover 1210 and the second headrest cover 1220 are coupled to each other.

The first headrest cover 1210 and the second headrest cover 1220 include the first and second fastening parts 1215 and 1225 to which a bolt is fastened, and thus the first headrest cover 1210 and the second headrest cover 1220 are coupled to each other. Further, a fastening hook 1219 is formed at an edge of the first headrest cover 1210 to temporarily assemble the first headrest cover 1210 with the second headrest cover 1220, and a fastening hole 1229 into which the fastening hook 1219 is inserted is formed at an edge of the second headrest cover 1220.

The sliding member coupling part is formed in the headrest cover 1200. The sliding member coupling part is disposed above the stay rod coupling part. The sliding member coupling part includes an insertion groove passing therethrough in a lateral direction.

The sliding member coupling parts are divided and formed in the first headrest cover 1210 and the second headrest cover 1220. Thus, the sliding member coupling part includes a first sliding member coupling part 1212 and a second sliding member coupling part 1222.

The divided first and second sliding member coupling parts 1212 and 1222 are coupled to each other when the first headrest cover 1210 and the second headrest cover 1220 are coupled to each other.

A locking member moving space 1223 is formed between the sliding member coupling parts at both sides of the headrest cover 1200. The locking member moving space 1223 includes the locking member disposed therein so that the locking member easily rotates with respect to the headrest cover 1200.

The locking member moving space 1223 is divided and formed in the first headrest cover 1210 and the second headrest cover 1220.

Incised parts into which the first rod 110 is inserted are formed in a lower surface and a rear lower end of the second headrest cover 1220. The incised parts are formed to vertically pass through the second headrest cover 1220. The incised parts are formed in both sides of the headrest cover 1200. The incised part allows the headrest cover 1200 not to interfere with the first rod 110 when the headrest is folded.

Further, button member installation parts 1214 and 1224 are divided and formed at side surfaces of the first and second headrest covers 1210 and 1220. The button member installation part 1224 includes a button member through hole passing therethrough in a lateral direction so that a bezel 1531 of a button member is inserted thereinto.

The bracket 1300 is fixed to an upper center of the second rod 120 of the stay rod 100. The bracket 1300 is installed behind the second rod 120 in an inclined manner so that a front end of a bottom plate is disposed above a rear end thereof.

A main spring 600 is disposed at a left side of the bracket 1300. A second end of the main spring 600 is caught on the bracket 1300, and a first end thereof is caught on the second headrest cover 1220. An elastic force of the main spring 600 is applied to the headrest cover 1200 so that the headrest rotates in a clockwise or counterclockwise direction.

The locking member includes the guide rod 1540 rotatably installed in the bracket 1300, a sliding member 1510 slidably installed on the guide rod 1540, and a fixing part allowing the sliding member 1510 to move or not to move on the guide rod 1540.

The fixing part of the embodiment of the present invention includes the notches 1541 formed in the guide rod 1540, and a moving member 1520 slidably installed on the sliding member 1510 and having a catching part 1521 for insertion into the notches 1541.

The guide rod 1540 includes a rod main body 1542 with a polygonal horizontal cross-section and a bracket coupling part 1543 formed at a lower end of the rod main body 1542 in a cylindrical shape.

Further, the at least three notches 1541 are formed in one side of the rod main body 1542 at predetermined intervals. Thus, the headrest controlling apparatus of the embodiment of the present invention may control the headrest to various angles.

The bracket coupling part 1543 is rotatably coupled to the bracket 1300 through a hinge 1545.

A cover coupling part 1512 is formed at a front lower portion of the sliding member 1510. The cover coupling part 1512 protrudes in a lateral direction and has a cylindrical shape. Both sides of the cover coupling part 1512 are inserted into the first and second sliding member coupling parts 1212 and 1222. Therefore, the sliding member 1510 is rotatably installed in the headrest cover 1200.

When the headrest is upright, a shaft of the cover coupling part 1512 is disposed above a shaft of the second rod 120 and is disposed forward of a shaft of the hinge 1545. When the headrest is upright, the rod main body 1542 is vertically disposed.

The reinforcing member 1523 molded in an insert-injection molding manner and inserted into the notches 1541 is formed in the catching part 1521.

The headrest controlling apparatus of the embodiment of the present invention further includes a button member so that a user moves the moving member 1520 at the outside.

The button member includes a bezel 1531, a button 1534 fitted onto the bezel 1531, and a button spring 1533 for returning the button 1534.

The bezel 1531 includes a guide hole 1531*f* formed to pass therethrough in a lateral direction so that a guide protrusion 1534*f* formed on the button 1534 is inserted thereinto. The guide protrusion 1534*f* and the guide hole 1531*f* allow the button 1534 to be easily pushed. The guide protrusions 1534*f* may be formed at upper and lower portions of the button 1534.

A push rod of the button 1534 may be divided into two. That is, the push rod may include a first push rod and a second push rod 1534*d*. The first push rod is integrally formed in the button 1534, and the second push rod 1534*d* is formed to be separated from the first push rod. The second push rod 1534*d* includes a first contact part which is in contact with the first push rod and a second contact part which is in contact with the moving member 1520. The first contact part and the second contact part are not coaxially disposed, and may be disposed to be staggered in a vertical direction or a forward or backward direction. The headrest cover 1200 may include a second push rod mounting part (not shown) so that the second push rod 1534*d* is not moved in the headrest cover 1200 in a vertical direction or a forward or backward direction.

Hereinafter, operation of the embodiment of the present invention with the above-described configuration will be described.

When a user pushes the button 1534 of the button member to tilt the headrest which is in an upright state as shown in FIG. 16, the moving member 1520 which is in contact with the second push rod 1534*d* of the button 1534 is also pushed.

When the moving member 1520 is pushed, the reinforcing member 1523 inserted into the notches 1541 escapes from the notches 1541.

When the headrest is unlocked, the sliding member 1510 is movable in the rod main body 1542. That is, the headrest cover 1200 may rotate about the second rod 120 of the stay rod 100. Therefore, an angle of the headrest may be variously controlled.

When the headrest is moved to a required position, then a force pushing the button 1534 is removed, the button 1534 and the moving member 1520 are returned to the original position by the button spring 1533 and the moving member spring 1550.

Thus, as shown in FIG. 11, the reinforcing member 1523 is inserted into the notches 1541, and a position of the headrest is fixed.

The position of the headrest can be controlled, and thus the headrest can be directly moved forward or rearward of a current position, and the headrest can be easily moved. A portion for unlocking is not required, and thus the apparatus can be compact.

While the present invention has been described with reference to the exemplary embodiments, it may be understood by those skilled in the art that various changes and modifications may be made without departing from the spirit and scope of the present invention as defined by the appended claims.

DESCRIPTION OF SYMBOLS

\*\*Description of Symbols for Main Parts in Drawings\*\*
100: STAY ROD

110: FIRST ROD
111: INCLINED PART
120: SECOND ROD
200: HEADREST COVER
210: FIRST HEADREST COVER
211: FIRST STAY ROD COUPLING PART
212: FIRST SLIDING MEMBER COUPLING PART
215: FIRST FASTENING PART
216: FIRST INCISED PART
219: BRACKET INSERTION PART
220: SECOND HEADREST COVER
221: SECOND STAY ROD COUPLING PART
222: SECOND SLIDING MEMBER COUPLING PART
223: LOCKING MEMBER MOVING SPACE
224: BUTTON MEMBER INSTALLATION PART
225: SECOND FASTENING PART
226: SECOND INCISED PART
300: BRACKET
301: SECOND MAIN SPRING CATCHING PART
310: BOTTOM PLATE
321: SIDE PLATE
322: SECOND ROD MOUNTING PART
510: SLIDING MEMBER
511: FIRST THROUGH HOLE
512: COVER COUPLING PART
513: SLIDING GROOVE
518: LONG HOLE
519: SPRING INSERTION PART
520: MOVING MEMBER
521: CATCHING PART
522: SPRING SUPPORTING PART
523: REINFORCING MEMBER
524: SECOND THROUGH HOLE
525: PROTRUSION PART
526: HOOK
530: BUTTON MEMBER
531: BEZEL
531A: FASTENING HOOK
531B: BUTTON ROD GUIDE PART
531C: FASTENING LONG HOLE
531D: BEZEL BODY
531E: BEZEL FLANGE
532: BUTTON SPRING SLEEVE
533: BUTTON SPRING
534: BUTTON
534A: RECTANGULAR PUSHING PART
534B: SECOND FASTENING HOOK
534C: GUIDE PIECE
534D: PUSH ROD
540: GUIDE ROD
541: NOTCH
542: ROD MAIN BODY
543: BRACKET COUPLING PART
545: HINGE
550: MOVING MEMBER SPRING
600: MAIN SPRING
601: FIRST TIP END
602: SECOND TIP END
603: COIL PART

The invention claimed is:

1. A headrest controlling apparatus comprising:
a headrest cover;
a bracket being installed on a stay rod; and
a locking member, being installed in the bracket, fixing a position of a headrest, and including:
a guide rod rotatably installed in the bracket;
a sliding member slidably installed on the guide rod and rotatably installed in the headrest cover; and
a fixing part configured to allow the sliding member to move or not to move on the guide rod;
wherein the headrest cover includes a stay rod coupling part to which the stay rod is rotatably coupled,
wherein the fixing part includes:
a notch formed in the guide rod;
a moving member, being slidably installed on the sliding member, having a catching part inserted into the notch; and
a reinforcing member formed in the catching part;
wherein the guide rod includes a rod main body,
wherein the catching part includes a second through hole which the rod main body is inserted thereinto,
wherein the reinforcing member surrounds the second through hole,
wherein at least a part of the reinforcing member is exposed at the outside so that the reinforcing member is inserted into and caught by the notch,
the headrest cover includes at least a first headrest cover and a second headrest cover; and
sliding member coupling parts are divided and formed in the first headrest cover and the second headrest cover,
the sliding member coupling parts include a first sliding member coupling part and a second sliding member coupling part,
the first and second sliding member coupling parts are coupled to each other when the first headrest cover and the second headrest cover are coupled to each other,
a cover coupling part is formed at the sliding member,
both sides of the cover coupling part are inserted into the first and second sliding member coupling parts and,
the sliding member is rotatably installed in the headrest cover via the connection between the sliding member coupling parts and the cover coupling part, wherein each of the headrest covers is molded as one-piece.

2. The headrest controlling apparatus according to claim 1, wherein:
the stay rod coupling part includes a through hole into which the stay rod is inserted; and
the through hole is formed in the first headrest cover and the second headrest cover.

3. The headrest controlling apparatus according to claim 1, wherein the stay rod coupling part includes a through hole into which the stay rod is inserted, and the stay rod coupling part includes at least one separation part so that the through hole communicates with the outside.

* * * * *